US012149501B2

(12) United States Patent
Xu et al.

(10) Patent No.: US 12,149,501 B2
(45) Date of Patent: Nov. 19, 2024

(54) METHOD AND ENTITY FOR TRANSMITTING A PLURALITY OF MAC ADDRESSES

(71) Applicant: Telefonaktiebolaget LM Ericsson (publ), Stockholm (SE)

(72) Inventors: Wenliang Xu, Shanghai (CN); Susana Fernandez Alonso, Madrid (ES); Fuencisla Garcia Azorero, Madrid (ES); Nevenka Biondic, Zagreb (HR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/632,919

(22) PCT Filed: Aug. 10, 2020

(86) PCT No.: PCT/CN2020/108192
§ 371 (c)(1),
(2) Date: Feb. 4, 2022

(87) PCT Pub. No.: WO2021/031904
PCT Pub. Date: Feb. 25, 2021

(65) Prior Publication Data
US 2022/0272068 A1 Aug. 25, 2022

(30) Foreign Application Priority Data
Aug. 16, 2019 (WO) ................ PCT/CN2019/101098

(51) Int. Cl.
*H04L 61/50* (2022.01)
*H04L 101/622* (2022.01)

(52) U.S. Cl.
CPC ........ *H04L 61/50* (2022.05); *H04L 2101/622* (2022.05)

(58) Field of Classification Search
CPC .................................................... H04L 61/50
(Continued)

(56) References Cited

U.S. PATENT DOCUMENTS

| 8,964,740 B2 | 2/2015 | Silver |
| 10,674,331 B1 * | 6/2020 | Huang .................. H04W 4/023 |

(Continued)

FOREIGN PATENT DOCUMENTS

| CN | 1750512 A | 3/2006 |
| CN | 101018108 A | 8/2007 |

(Continued)

OTHER PUBLICATIONS

Tencent "Support for Goupcast Traffic Forwarding of a 5G VN" SA WG2 Meeting #134, Jun. 24-28, 2019, Sapporo, Japan, S2-1907545, 4 pages.

(Continued)

*Primary Examiner* — James E Springer
(74) *Attorney, Agent, or Firm* — Rothwell, Figg, Ernst & Manbeck, P.C.

(57) ABSTRACT

Embodiments of the present disclosure relates to a method and an entity for transmitting a plurality of media access control, MAC, addresses. A method performed at a first entity for transmitting a plurality of media access control, MAC, addresses, comprises: transmitting (S101), to a second entity, a message including a first parameter and a second parameter. The first parameter and the second parameter indicate the plurality of MAC addresses. The plurality of MAC addresses may comprise a plurality of source MAC addresses; and/or a plurality of destination MAC addresses. According to embodiments of the present disclosure, a plurality of MAC addresses may be simultaneously trans- (Continued)

mitted among the nodes in the communication network, and thus the efficiency of the communication network may be further improved.

16 Claims, 7 Drawing Sheets

(58) Field of Classification Search
USPC .......................................................... 709/245
See application file for complete search history.

(56) References Cited

U.S. PATENT DOCUMENTS

| | | | |
|---|---|---|---|
| 2003/0112810 | A1 | 6/2003 | Nakabayashi et al. |
| 2008/0089338 | A1 | 4/2008 | Campbell et al. |
| 2013/0058273 | A1* | 3/2013 | Wentink ............... H04B 7/0452 370/328 |
| 2019/0357301 | A1* | 11/2019 | Li .......................... H04W 80/10 |
| 2020/0045011 | A1* | 2/2020 | Nayak ................. H04L 61/5046 |

FOREIGN PATENT DOCUMENTS

| | | |
|---|---|---|
| CN | 102439918 A | 5/2012 |
| EP | 2833576 A1 | 2/2015 |
| EP | 2962521 B1 | 5/2019 |

OTHER PUBLICATIONS

3GPP "3rd Generation Partnership Project; Technical Specification Group Services and System Aspects; System Architecture for the 5G System; Stage 2 (Release 16)" 3GPP TS 23.501 V16.1.0 (Jun. 2019), 368 pages.
3GPP "3rd Generation Partnership Project; Technical Specification Group Services and System Aspects; Procedures for the 5G System; Stage 2 (Release 16)" 3GPP TS 23.502 V16.1.1 (Jun. 2019), 495 pages.
Ericsson "Support a set of MAC addresses in traffic filter" 3GPP TSG-CT WG3 Meeting #105, Wroclaw, Poland, Aug. 26-30, 2019, CR 29.122, 4 pages.
Ericsson "Support a set of MAC addresses in traffic filter" 3GPP TSG-CT WG3 Meeting #105, Wroclaw, Poland, Aug. 26-30, 2019, CR 29.514, 21 pages.
Ericsson "Support a set of MAC addresses in traffic filter" 3GPP TSG-CT WG3 Meeting #105, Wroclaw, Poland, Aug. 26-30, 2019, CR 29.522, 5 pages.
Ericsson "Support a set of MAC addresses in traffic filter" 3GPP TSG-CT WG4 Meeting #93, 3GPP TSG-CT WG3 Meeting #105, Wroclaw, Poland, Aug. 26-30, 2019, CR 29.504, 3 pages.
Ericsson "Support a set of MAC addresses in traffic filter" 3GPP TSG-CT WG3 Meeting #105, Wroclaw, Poland, Aug. 26-30, 2019, CR 29.512, 9 pages.
Ericsson "Support a set of MAC addresses in traffic filter" 3GPP TSG-CT WG3 Meeting #105, Wroclaw, Poland, Aug. 26-30, 2019, CR 29.523, 4 pages.
Ericsson "Identifiers and Addresses for D2D Communication" 3GPP TSG-RAN WG2 #85bis Tdoc R2-14126204 Apr. 2014 (Apr. 4, 2014), 12 pages.
International Search Report and the Written Opinion of the International Searching Authority, issued in corresponding International Application No. PCT/CN2020/108192, dated Nov. 20, 2020, 6 pages.

\* cited by examiner

METHOD AND ENTITY FOR TRANSMITTING A PLURALITY OF MAC ADDRESSES

CROSS REFERENCE TO RELATED APPLICATION(S)

This application is a 35 U.S.C. § 371 National Phase Entry Application from PCT/CN2020/108192, filed Aug. 10, 2020, designating the United States, and also claims the benefit of International Application No. PCT/CN2019/101098, filed Aug. 16, 2019, the disclosures of which are incorporated herein by reference in their entirety.

TECHNICAL FIELD

The present disclosure relates generally to the technology of communication system, and in particular, to a method and an entity for transmitting a plurality of media access control, MAC, addresses.

BACKGROUND

This section introduces aspects that may facilitate better understanding of the present disclosure. Accordingly, the statements of this section are to be read in this light and are not to be understood as admissions about what is in the prior art or what is not in the prior art.

In communication systems, such as the fifth generation system, 5GS, an ethernet protocol data unit, PDU, session type is supported. Any 5G user equipment, UE, can request to establish a PDU session of Ethernet type to the 5G network, see third generation partnership project technical specification, 3GPP TS 23.501 V16.1.0, clause 5.6.10.2 and 8.3.1.

For a PDU Session setting up procedure with the Ethernet PDU Session type, a session management function, SMF, and a user plane function, UPF, acting as PDU Session Anchor (PSA) can support specific behaviours related with the fact that the PDU Session carries Ethernet frames.

Different Frames exchanged on a PDU Session of Ethernet type may be served with different quality of service, QoS, over the 5GS. Thus, the SMF may provide, to the UPF, Ethernet Packet Filter Set and forwarding rule(s), based on the Ethernet frame structure and UE MAC address(es). The UPF detects and forwards Ethernet frames based on the Ethernet Packet Filter Set and forwarding rule(s) received from the SMF, further see clauses 5.7 and 5.8.2.

FIG. 1 an exemplary diagram showing a protocol stack for the user plane transport related with a PDU Session (see FIG. 8.3.1-1 in 3GPP TS 23.501 V16.1.0).

As shown in FIG. 1, the PDU layer corresponds to the PDU carried between the UE and the domain name, DN, over the PDU Session. When the PDU Session Type is IPv4 or IPv6 or IPv4v6, it corresponds to IPv4 packets or IPv6 packets or both of them; when the PDU Session Type is Ethernet, it corresponds to Ethernet frames; etc. "IPv" refers to internet protocol version.

A GPRS (General Packet Radio Service) Tunnelling Protocol for the user plane (GTP U) supports tunnelling user data over N3 (i.e. an interface between the 5G-AN (access network) node and the UPF) and N9 (i.e. an interface between different UPFs of the 5GC (fifth generation core network)) in the backbone network (see TS 29.281 V15.5.0). GTP shall encapsulate all end user PDUs. It provides encapsulation on a per PDU Session level. This layer also carries the marking associated with a QoS Flow defined in clause 5.7. This protocol is also used on N4 interface as defined in TS 29.244 V16.0.0.

An application function, AF, or any other third party server may want provide a group service for a plurality of UEs, which are identified by different MAC addresses, via the communication network. However, the network only supports messages/procedures relating to a single MAC address. To accomplish one same operation (e.g. sending the same notification) for all the UEs, the AF, or any other third party server has to repeatedly initiate the same type of procedures (e.g. authorizing service data flow) and exchange the same type of messages/signalling with the network. These messages/signallings may include the same content, only for different MAC addresses. The efficiency needs to be further improved.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Namely, according to embodiments of the present disclosure, a plurality of MAC addresses may be simultaneously transmitted among the nodes in the communication network, and thus the efficiency of the communication network may be further improved.

A first aspect of the present disclosure provides a method performed at a first entity for transmitting a plurality of media access control, MAC, addresses, may comprise: transmitting, to a second entity, a message including a first parameter and a second parameter. The first parameter and the second parameter indicate the plurality of MAC addresses. The plurality of MAC addresses may comprise a plurality of source MAC addresses; and/or a plurality of destination MAC addresses.

In embodiments of the present disclosure, the first parameter may comprise a MAC address in the plurality of MAC addresses. The second parameter may comprise an integer value indicating a length of a prefix of the MAC address. The plurality of MAC addresses has the same prefix as the MAC address.

In embodiments of the present disclosure, the plurality of MAC addresses may be continuous. The first parameter may comprise a start MAC address of the plurality of MAC addresses. The second parameter may comprise an end MAC address of the plurality of MAC addresses.

In embodiments of the present disclosure, the plurality of MAC addresses may be continuous. The first parameter may comprise a start MAC address of the plurality of MAC addresses. The second parameter may comprise an integer value indicating number of addresses in the plurality of MAC addresses.

In embodiments of the present disclosure, the second parameter may be optional. The first parameter may be conditional and depend on a usage of the second parameter. The first parameter may be reused to indicate a single MAC address, when the second parameter is not used.

In embodiments of the present disclosure, a feature about whether to use the second parameter may be negotiated between the first entity and the second entity.

In embodiments of the present disclosure, the message may comprise at least one of: a policy authorization request message, from an application function, AF, to a policy control function, PCF; a traffic influence request message, from an AF to a network exposure function, NEF; a policy authorization request message, from a NEF to a PCF; a session management policy control request message, from a PCF, to a session management function, SMF; a data repository request message, from a NEF to a unified data repository, UDR; or a data repository request message, from a UDR to a PCF.

In embodiments of the present disclosure, the first entity may comprise at least one of: an AF, a NEF, a PCF, or a UDR. The second entity may comprise at least one of: a PCF, a NEF, SMF, or a UDR.

A second aspect of the present disclosure provides a method performed at a second entity for receiving a plurality of media access control, MAC, addresses, comprising: receiving, from a first entity, a message including a first parameter and a second parameter. The first parameter and the second parameter indicate the plurality of MAC addresses. The plurality of MAC addresses may comprise a plurality of source MAC addresses; and/or a plurality of destination MAC addresses.

In embodiments of the present disclosure, the plurality of MAC addresses may be continuous. The first parameter may comprise a MAC address in the plurality of MAC addresses. The second parameter may comprise an integer value indicating a length of a prefix of the MAC address. The plurality of MAC addresses has the same prefix as the MAC address.

In embodiments of the present disclosure, the plurality of MAC addresses may be continuous. The first parameter may comprise a start MAC address of the plurality of MAC addresses. The second parameter may comprise an end MAC address of the plurality of MAC addresses.

In embodiments of the present disclosure, the first parameter may comprise a start MAC address of the plurality of MAC addresses. The second parameter may comprise an integer value indicating number of addresses in the plurality of MAC addresses.

In embodiments of the present disclosure, the second parameter is optional. The first parameter is conditional and depends on a usage of the second parameter. The first parameter is reused to indicate a single MAC address, when the second parameter is not used.

In embodiments of the present disclosure, a feature about whether to use the second parameter is negotiated between the first entity and the second entity.

In embodiments of the present disclosure, the message may comprise at least one of: a policy authorization request message, from an application function, AF, to a policy control function, PCF; a traffic influence request message, from an AF to a network exposure function, NEF; a policy authorization request message, from a NEF to a PCF; a session management policy control request message, from a PCF, to a session management function, SMF; a data repository request message, from a NEF to a unified data repository, UDR; or a data repository request message, from a UDR to a PCF.

In embodiments of the present disclosure, the first entity may comprise at least one of: an AF, a NEF, a PCF, or a UDR. The second entity may comprise at least one of: a PCF, a NEF, SMF, or a UDR.

In embodiments of the present disclosure, the method may further comprise: performing a task relating to the plurality of addresses.

In embodiments of the present disclosure, the task may comprise a single processing procedure relating to all the plurality of addresses.

In embodiments of the present disclosure, the task may comprise a plurality of continuous processing procedures respectively relating to each of the plurality of addresses.

A third aspect of the present disclosure provides a first entity, comprising: a processor; and a memory, containing instructions executable by the processor. The first entity is operative to: transmit, to a second entity, a message including a first parameter and a second parameter. The first parameter and the second parameter indicate the plurality of MAC addresses. The plurality of MAC addresses may comprise a plurality of source MAC addresses; and/or a plurality of destination MAC addresses.

In embodiments of the present disclosure, the first entity is further operative to implement any of the methods according to the first aspect above described.

A fourth aspect of the present disclosure provides a second entity, comprising: a processor; and a memory, containing instructions executable by the processor. The second entity is operative to: receive, from a first entity, a message including a first parameter and a second parameter. The first parameter and the second parameter indicate the plurality of MAC addresses. The plurality of MAC addresses may comprise a plurality of source MAC addresses; and/or a plurality of destination MAC addresses.

In embodiments of the present disclosure, the second entity is further operative to implement any of the methods according to the second aspect above described.

A fifth aspect of the present disclosure provides a first entity, comprising: a transmission unit, configured to transmit, to a second entity, a message including a first parameter and a second parameter. The first parameter and the second parameter indicate the plurality of MAC addresses. The plurality of MAC addresses may comprise a plurality of source MAC addresses; and/or a plurality of destination MAC addresses.

In embodiments of the present disclosure, the first entity is further operative to implement any of the methods according to the first aspect above described.

A sixth aspect of the present disclosure provides a second entity, comprising: a reception unit, configured to receive, from a first entity, a message including a first parameter and a second parameter. The first parameter and the second parameter indicate the plurality of MAC addresses. The plurality of MAC addresses may comprise a plurality of source MAC addresses; and/or a plurality of destination MAC addresses.

In embodiments of the present disclosure, the second entity is further operative to implement any of the methods according to the second aspect above described.

A seventh aspect of the present disclosure provides a computer readable storage medium having a computer program stored thereon. The computer program is executable by an entity to cause the entity to carry out any of the methods according to the first and second aspects above described.

A eighth aspect of the present disclosure provides a method implemented in a communication system, comprising: at a first entity, transmitting a plurality of media access control, MAC, addresses, comprising: transmitting, to a second entity, a message including a first parameter and a second parameter; at a second entity, receiving the plurality of media access control, MAC, addresses, comprising:

receiving, from the first entity, the message including the first parameter and the second parameter. The first parameter and the second parameter indicate the plurality of MAC addresses. The plurality of MAC addresses comprises: a plurality of source MAC addresses; and/or a plurality of destination MAC addresses.

A ninth aspect of the present disclosure provides a communication system comprising: a first entity configured to perform: transmitting a plurality of media access control, MAC, addresses, comprising: transmitting, to a second entity, a message including a first parameter and a second parameter; a second entity configured to perform: receiving the plurality of MAC addresses, comprising: receiving, from the first entity, the message including the first parameter and the second parameter. The first parameter and the second parameter indicate the plurality of MAC addresses. The plurality of MAC addresses comprises: a plurality of source MAC addresses; and/or a plurality of destination MAC addresses.

According to embodiments of the present disclosure, a plurality of MAC addresses, particularly comprising a plurality of source MAC addresses and/or a plurality of destination MAC addresses, may be simultaneously transmitted among the nodes in the communication network, and thus the efficiency of the communication network may be further improved.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
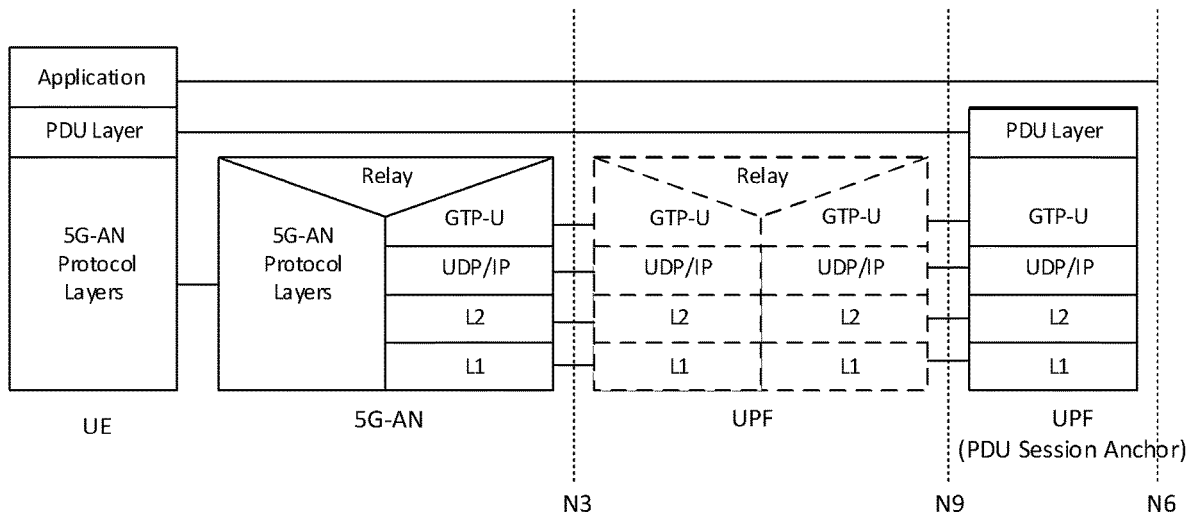
FIG. 1 an exemplary diagram showing a protocol stack for the user plane transport related with a PDU Session.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "entity", "network entity", "network function" may refer to a network device/apparatus/node with accessing capability in a communication network via which a terminal device accesses to the network and receives services therefrom. The entity/function may include a base station (BS), an access point (AP), a multi-cell/multicast coordination entity (MCE), a server node/function (such as a service capability server/application server, SC S/AS, group communication service application server, GCS AS, application function, AF), an exposure node (such as a service capability exposure function, SCEF, network exposure function, NEF), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network function/entity comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The network function/entity can be implemented either as a network element in a dedicated hardware, as a software instance running on a dedicated hardware, or as a virtualised function instantiated on an appropriated platform, e.g. on a cloud infrastructure. That is, the virtualization technology and network computing technology may be further introduced to improve the network function/entity, so as to improve the usage efficiency of the network resources and the flexibility of the network.

The term terminal device encompasses a device which is able to communicate with a network function/node such as a base station, or with another wireless device by transmitting and/or receiving wireless signals. Thus, the term terminal device encompasses, but is not limited to: a mobile phone, a stationary or mobile wireless device for machine-to-machine communication, an integrated or embedded wireless card, an externally plugged in wireless card, a vehicle, etc.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a user equipment, UE, implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

In such a communication system above described, in order to classify the packet in User plane (e.g. for the purpose of QoS handling, wherein QoS refers to quality of service), a traffic filter may be needed as described in 3GPP TS 23.501 V16.1.0 clause 5.7.6.

Particularly, in 3GPP TS 29.514 V16.1.0, the data type MediaSubcomponent includes Ethernet flow description including MAC address. But there is no support for how to specify a range of Ethernet MAC addresses. Further, there are many other 3GPP technical specifications re-use the same data type EthFlowDescription defined in TS 29.514 V16.1.0, so those specifications and corresponding functions/services (e.g. AF traffic influence service or PCF event exposure service) are also lacking the support of a range of Ethernet MAC addresses.

Consequently with existing specifications, if the service consumer wants to use the service for a list of MAC addresses in different scenarios, it might also lead to: inefficient encoding for the Ethernet flow, and possibly increased number of PCC rules due to increased number of media subcomponents, wherein PCC refers to Policy and Charging Control.

Embodiments of the present disclosure provide a method and an entity for transmitting a plurality of media access control, MAC, addresses.

Figure 2:
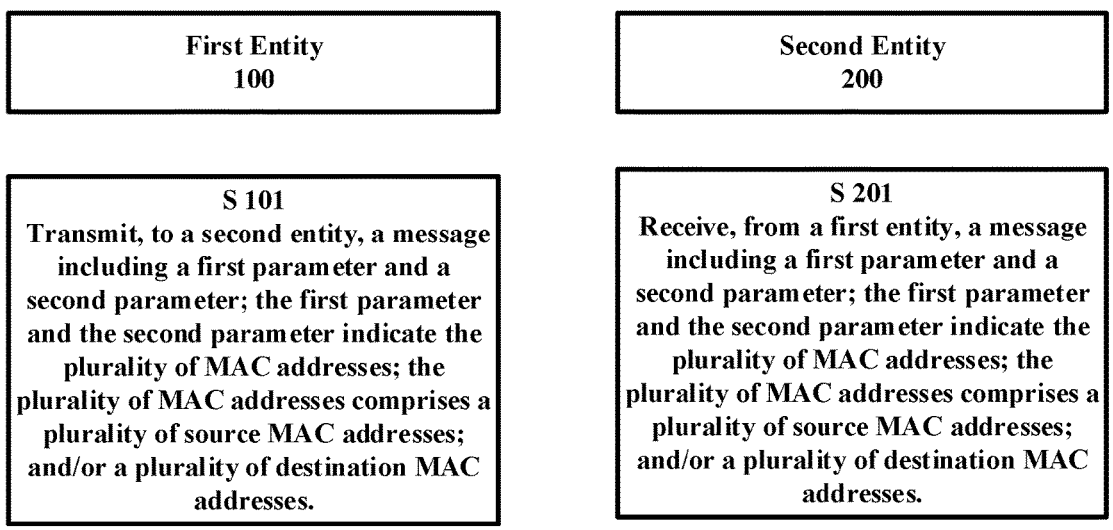
FIG. 2 is an exemplary flow chart showing methods according to embodiments of the present disclosure.

FIG. 2 is an exemplary flow chart showing methods according to embodiments of the present disclosure.

As shown in FIG. 2, a method performed at a first entity 100 may comprise: step S101, transmitting, to a second entity, a message including a first parameter and a second parameter. The first parameter and the second parameter indicate the plurality of MAC addresses.

Particularly, the plurality of MAC addresses may comprise a plurality of source MAC addresses, and/or a plurality of destination MAC addresses.

Further, a method performed at a second entity 200 may comprise: step S201, receiving, from a first entity, a message including a first parameter and a second parameter.

Therefore, according to embodiments of the present disclosure, a plurality of MAC addresses may be simultaneously transmitted among the nodes in the communication network, and thus the efficiency of the communication network may be further improved.

Particularly, only two parameters (the first parameter and the second parameter) are used to indicate the plurality of MAC addresses. Comparing to one conventional parameter indicating only one MAC address, the efficiency is improved greatly.

In embodiments of the present disclosure, the first parameter may comprise a MAC address in the plurality of MAC addresses. The second parameter may comprise an integer value indicating a length of a prefix of the MAC address. The plurality of MAC addresses has the same prefix as the MAC address.

In embodiments of the present disclosure, the plurality of MAC addresses are continuous. The first parameter may comprise a start MAC address of the plurality of MAC addresses. The second parameter may comprise an end MAC address of the plurality of MAC addresses.

FIGS. 3-7 shows exemplary implementations in some procedures, according to embodiments of the present disclosure.

In such procedures, in embodiments of the present disclosure, the message may comprise at least one of: a policy authorization request message, from an application function, AF, to a policy control function, PCF; a traffic influence request message, from an AF to a network exposure function, NEF; a policy authorization request message, from a NEF to a PCF; a session management policy control request message, from a PCF, to a session management function, SMF; a data repository request message, from a NEF to a unified data repository, UDR; or a data repository request message, from a UDR to a PCF.

In embodiments of the present disclosure, the first entity may comprise at least one of: an AF, a NEF, a PCF, or a UDR. The second entity may comprise at least one of: a PCF, a NEF, SMF, or a UDR.

Figure 3:
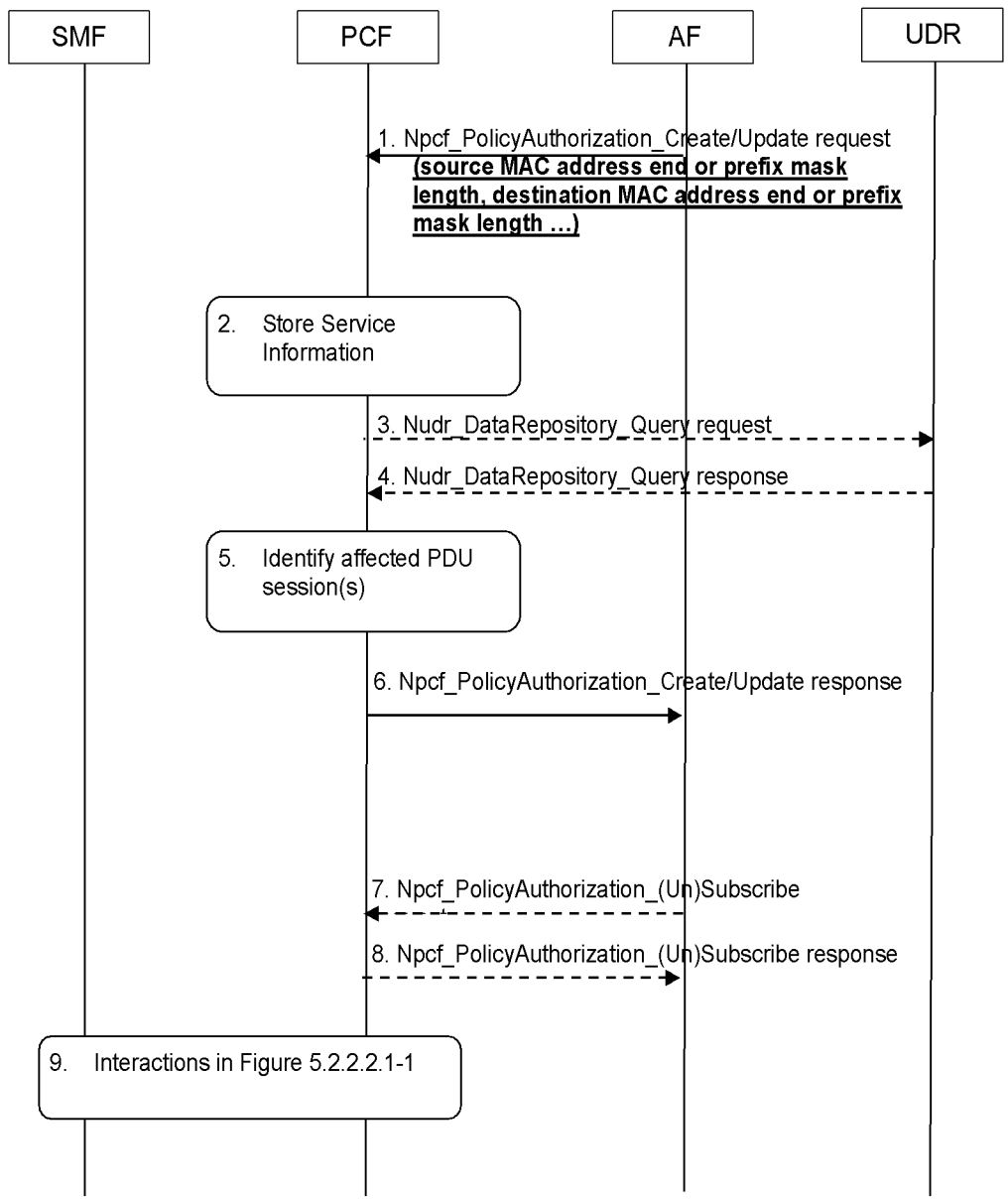
FIG. 3 is an exemplary diagram showing an implementation in procedure of AF session establishment or AF session modification, according to embodiments of the present disclosure.
Figure 5:
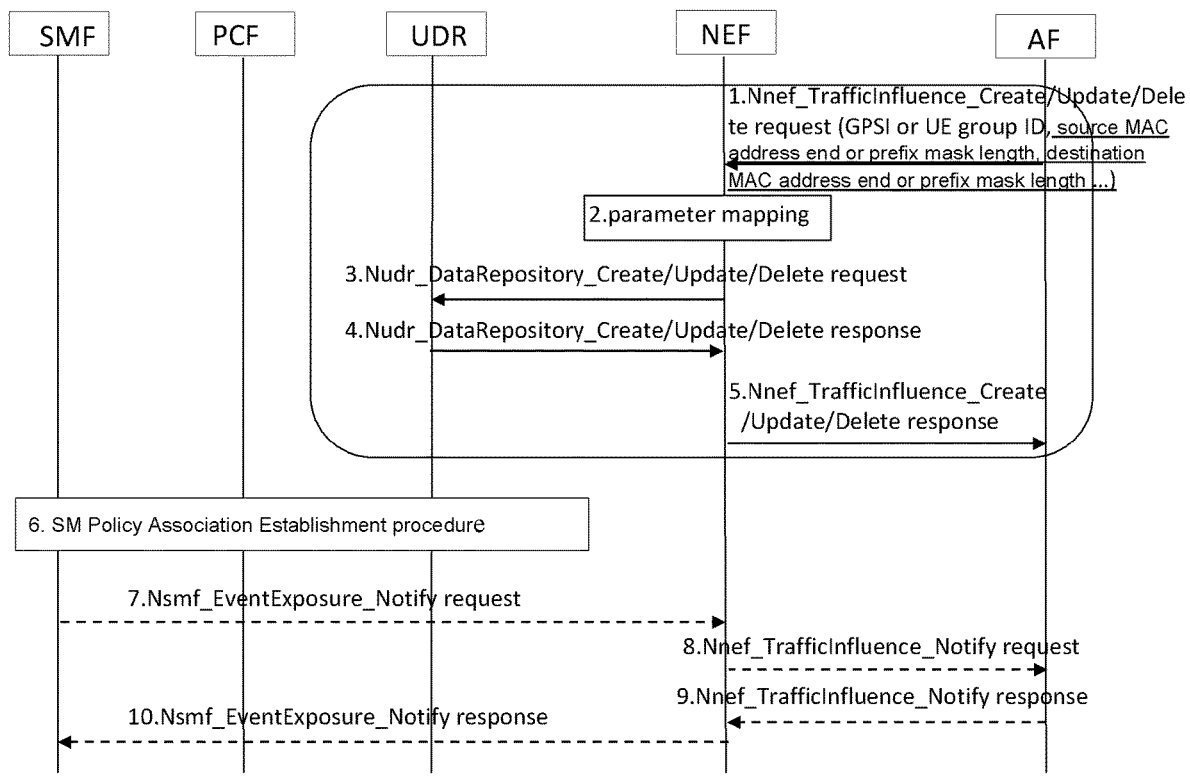
FIG. 5 is an exemplary diagram showing an implementation in procedure of AF traffic influence for future session not identified by UE address, according to embodiments of the present disclosure.

FIG. 3 is an exemplary diagram showing an implementation in procedure of AF session establishment or AF session modification, according to embodiments of the present disclosure (see FIGS. 5.2.2.2.2.1-1, 5.2.2.2.2.2-1 in 3GPP TS 29.513 V16.0.0, wherein steps 1 in FIGS. 5.2.2.2.2.1-1, 5.2.2.2.2.2-1 are combined, and steps 1a, 6a are ignored for clarity).

See 3GPP TS 29.513 V16.0.0, clause 5.2.2.2.2.1 AF Session Establishment and clause 5.2.2.2.2.2 AF session modification, a step 1 "Npcf_PolicyAuthorization_Create request" or "Npcf_PolicyAuthorization_Update request" is improved with underlined amendments. Further, the PCF Npcf_SMPolicyControl_UpdateNotify service operation is also impacted (which is contained in step 9 but not explicitly shown in this figure).

Specifically, the step 9 may include "SM Policy Association Modification initiated by the PCF" as described in FIG. 5.2.2.2.1-1 of 3GPP TS 29.513 V16.0.0.

Particularly, the Npcf_PolicyAuthorization_Create/Update request message in step 1 includes "source MAC address end or prefix mask length, destination MAC address end or prefix mask length" as above described parameters.

Figure 4:
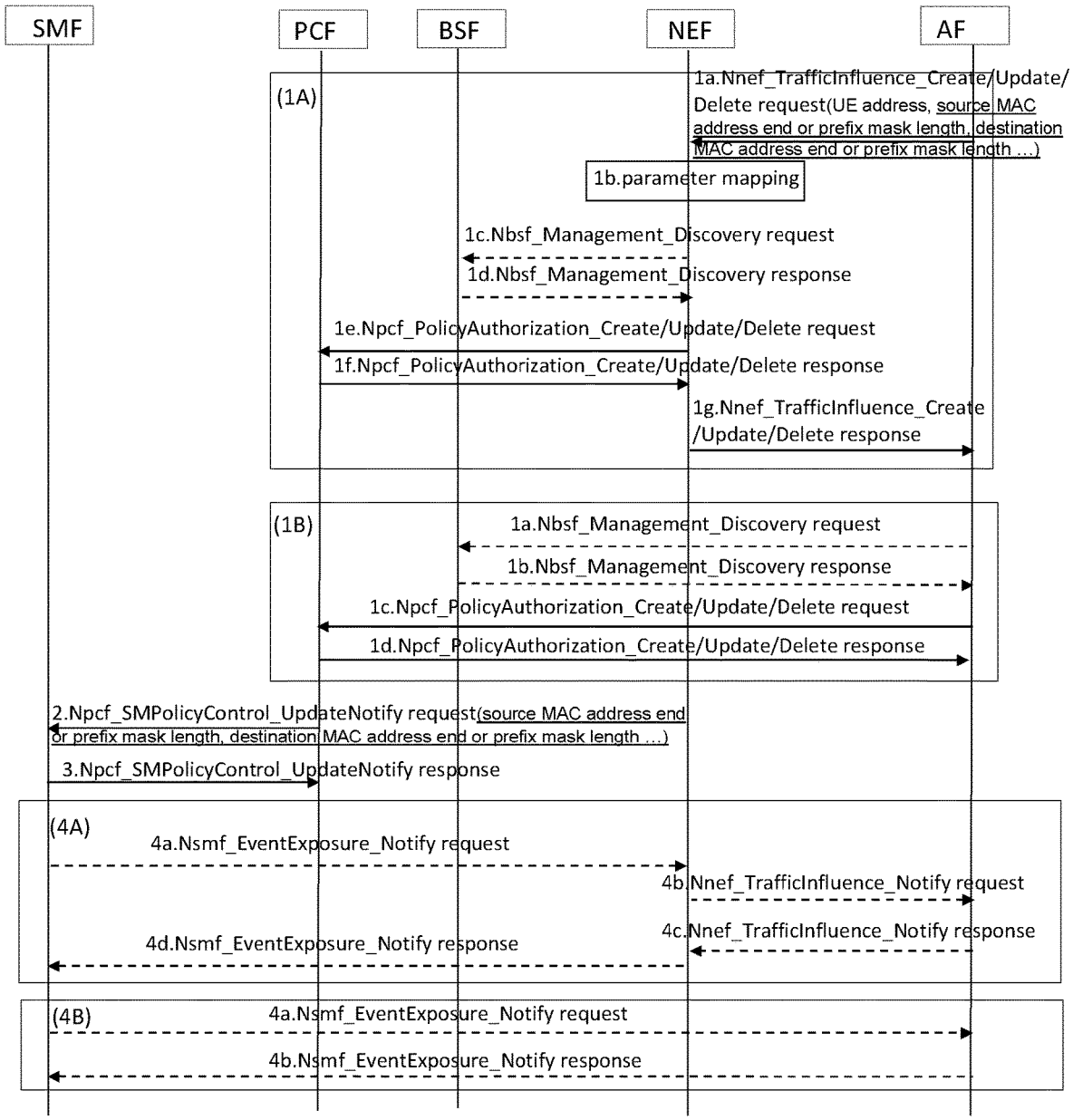
FIG. 4 is an exemplary diagram showing an implementation in procedure of AF traffic influence for sessions identified by a UE address, according to embodiments of the present disclosure.

FIG. 4 is an exemplary diagram showing an implementation in procedure of AF traffic influence for sessions identified by a UE address, according to embodiments of the present disclosure (see FIG. 5.5.3.2-1 in 3GPP TS 29.513 V16.0.0).

See TS 29.513 V16.0.0, clause 5.5.3.2, for AF traffic influence affecting ongoing PDU session (identified by UE address), the step 1a (only for Create/Update operation) is enhanced with new IEs (such as above described source MAC address end or prefix mask length, destination MAC address end or prefix mask length). The step 1e is also impacted (impact is the same as in FIG. 3).

FIG. 5 is an exemplary diagram showing an implementation in procedure of AF traffic influence for future session not identified by UE address, according to embodiments of the present disclosure (see FIG. 5.5.3.3-1 in 3GPP TS 29.513 V16.0.0).

See TS 29.513 V16.0.0, FIG. 5.5.3.3-1, for AF traffic influence affecting future PDU session (not identified by UE address), step 1 and step 3 (only for Create and Update operations) are enhanced with the new IEs (such as above described source MAC address end or prefix mask length, destination MAC address end or prefix mask length).

Figure 6:
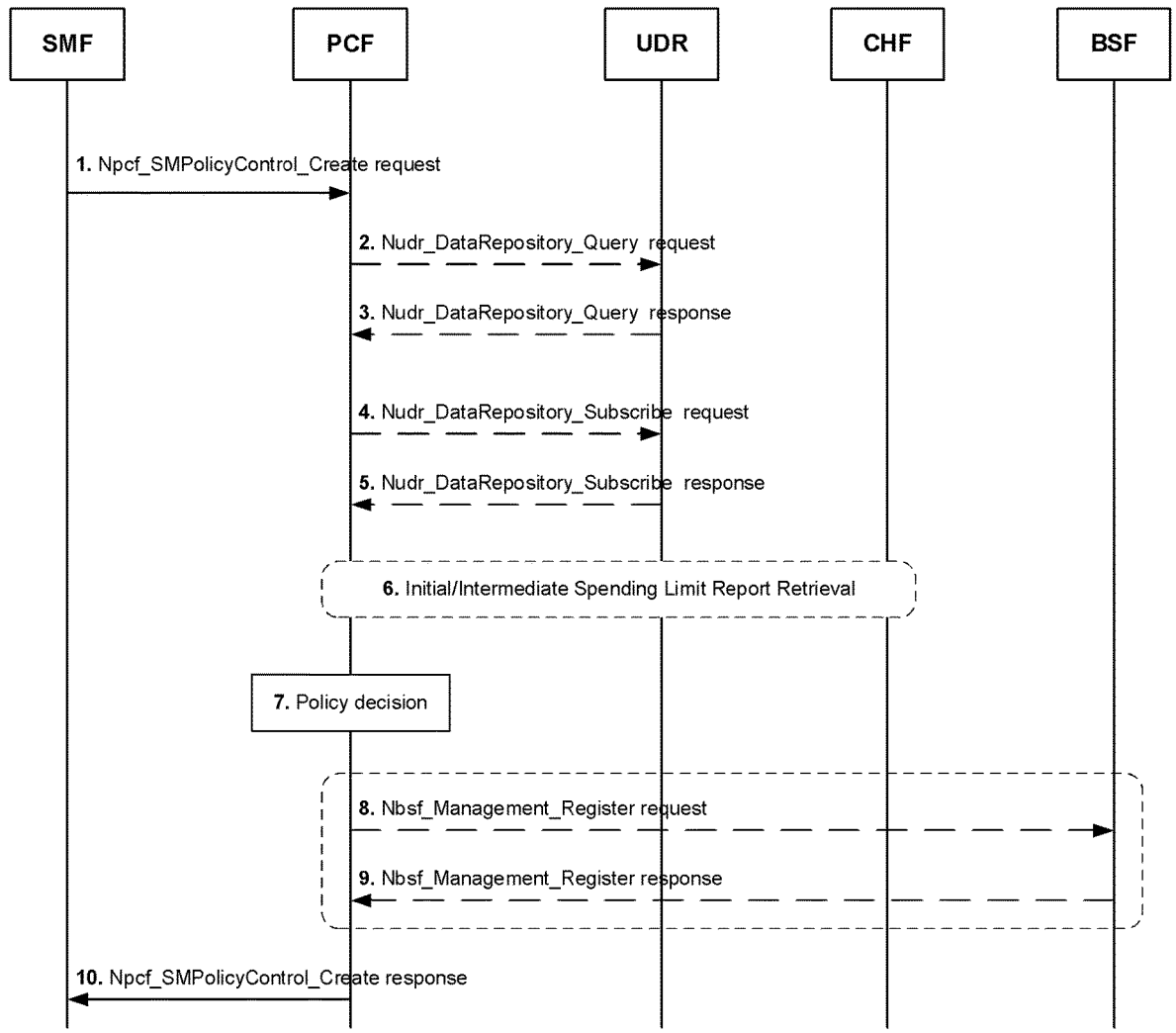
FIG. 6 is an exemplary diagram showing an implementation in procedure of SM Policy Association Establishment, according to embodiments of the present disclosure.

FIG. 6 is an exemplary diagram showing an implementation in procedure of SM Policy Association Establishment, according to embodiments of the present disclosure (see FIG. 5.2.1-1 in 3GPP TS 29.513 V16.0.0).

FIG. 6 depicts the step 6 in FIG. 5 in details. Step 3 Nudr_DataRepository_Get response and Step 10 Npcf_SMPolicyControl_Create response are impacted with new IEs (such as above described source MAC address end or prefix mask length, destination MAC address end or prefix mask length).

Figure 7:
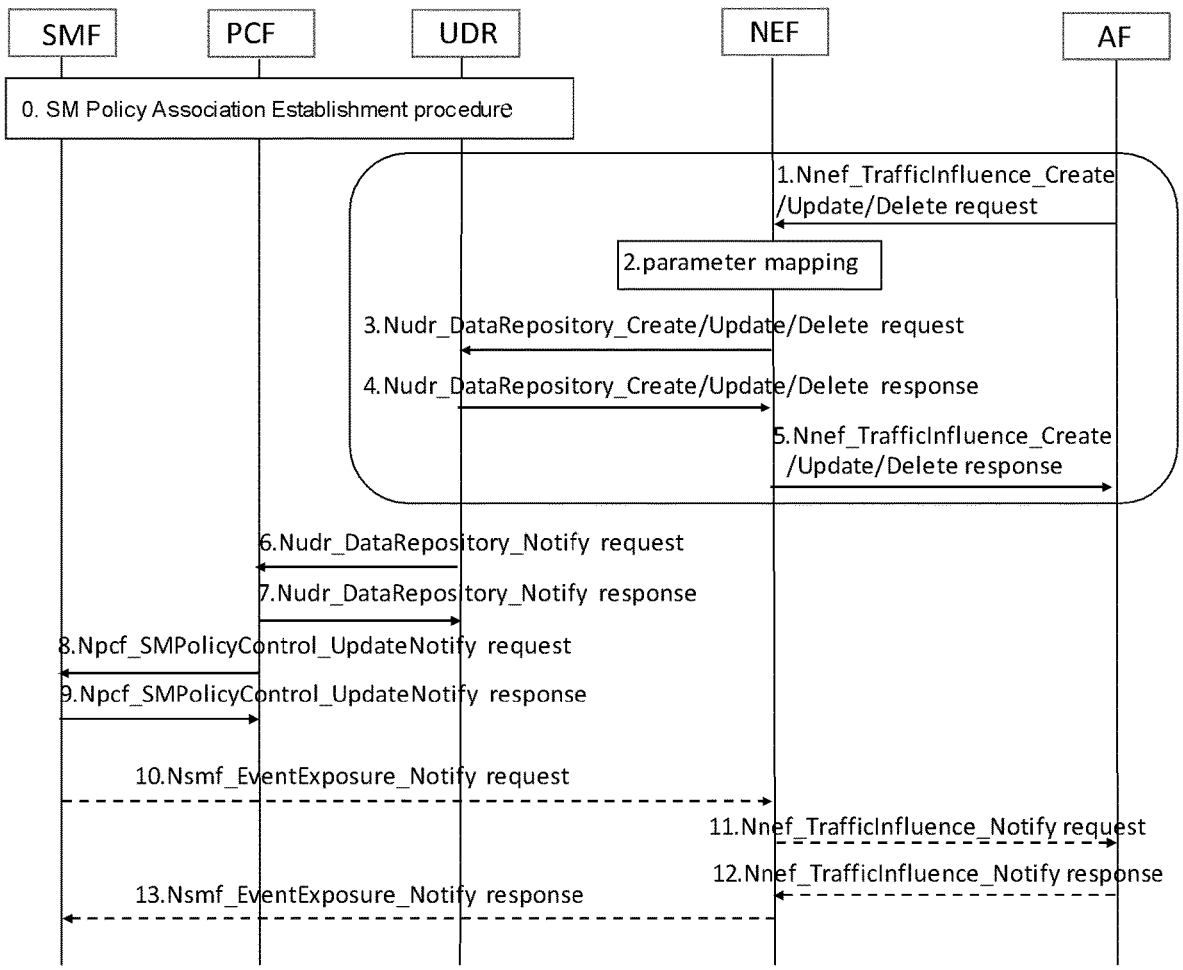
FIG. 7 is an exemplary diagram showing an implementation in procedure of AF traffic influence for ongoing session not identified by UE address, according to embodiments of the present disclosure.

FIG. 7 is an exemplary diagram showing an implementation in procedure of AF traffic influence for ongoing session not identified by UE address, according to embodiments of the present disclosure (see FIG. 5.5.3.3-2 in 3GPP TS 29.513 V16.0.0).

For AF traffic influence affecting ongoing PDU session (not identified by an UE address), the step 6 Nudr_DataRepository_Notify service operation and step 8 Npcf_SMPolicyControl_UpdateNotify service operation are also impacted.

Further, embodiments of the present disclosure may also be implemented to PCF provided event exposure service which is specified in 3GPP TS 29.523 V15.2.0.

The same impacts apply for Npcf_EventExposure_Subscribe service operation.

Impacts to different procedures and protocol encoding details may be further marked with track change in different tables described below.

Table 1 shows an exemplary implementation of embodiments of the present disclosure, in which an existing definition of type "EthFlowDescription" is improved.

TABLE 1

(see table 5.6.2.17-1 in 3GPP TS 29.514 V16.1.0): Definition of type EthFlowDescription.

| Attribute name | Data type | P | Cardinality | Description | Applicability |
| --- | --- | --- | --- | --- | --- |
| destMacAddr | MacAddr48 | C⊖ | 0 . . . 1 | Destination MAC address. It shall be present if destMacAddrMaskLen or destMacAddrEnd is present. | |
| ethType | string | M | 1 | A two-octet string that represents the Ethertype, as described in IEEE 802.3 [16] and IETF RFC 7042 [18] in hexadecimal representation. Each character in the string shall take a value of "0" to "9" or "A" to "F" and shall represent 4 bits. The most significant character representing the 4 most | |

TABLE 1-continued (see table 5.6.2.17-1 in 3GPP TS 29.514 V16.1.0): Definition of type EthFlowDescription.

| Attribute name | Data type | P | Cardinality | Description | Applicability |
|---|---|---|---|---|---|
| | | | | significant bits of the ethType shall appear first in the string, and the character representing the 4 least significant bits of the ethType shall appear last in the string. | |
| fDesc | FlowDescription | C | 0 . . . 1 | Contains the flow description for the Uplink or Downlink IP flow. It shall be present when the Ethertype is IP. | |
| fDir | FlowDirection | O | 0 . . . 1 | Contains the packet filter direction. | |
| sourceMacAddr | MacAddr48 | ~~C~~ O | 0 . . . 1 | Source MAC address. <u>It shall be present if srcMacAddrMaskLen or srcMacAddrEnd is present.</u> | |
| vlanTags | array(string) | O | 1 . . . 2 | Customer-VLAN and/or Service-VLAN tags containing the VID, PCP/DEI fields as defined in IEEE 802.1Q [17] and IETF RFC 7042 [18]. Each field is encoded as a two-octet string in hexadecimal representation. Each character in the string shall take a value of "0" to "9" or "A" to "F" and shall represent 4 bits. The most significant character representing the 4 most significant bits of the VID or PCF/DEI field shall appear first in the string, and the character representing the 4 least significant bits of the VID or PCF/DEI field shall appear last in the string. | |
| <u>srcMacAddrMaskLen</u> | integer | <u>O</u> | <u>0 . . . 1</u> | <u>Specifies the source MAC address mask length which is used to mask the sourceMacAddr attribute (from the left/ most significant bit to the right/least significant bit) to support a set of MAC addresses. E.g. a value 40 for a MAC address 00-10-A4-23-3E-00 means all MAC addresses from 00-10-A4-23-3E-00 up to and including 00-10-A4-23-3E-FF. (NOTE x)</u> | <u>MacAddressMask</u> |
| <u>destMacAddrMaskLen</u> | integer | <u>O</u> | <u>0 . . . 1</u> | <u>Specifies the destination MAC address mask length which is used to mask the destMacAddr attribute (from the left/ most significant bit to the right/least significant bit) to support a set of MAC addresses. (NOTE y)</u> | <u>MacAddressMask</u> |
| <u>srcMacAddrEnd</u> | MacAddr48 | <u>O</u> | <u>0 . . . 1</u> | <u>Source MAC address end. If this attribute is present, the sourceMacAddr attribute specifies the source MAC address start. E.g. srcMacAddrEnd with value 00-10-A4-23-3E-FE and sourceMacAddr with value 00-10-A4-23-3E-02 means all MAC addresses from 00-10-A4-23-3E-02 up to and including 00-10-A4-23-3E-FE. (NOTE x)</u> | <u>MacAddressRange</u> |
| <u>destMacAddrEnd</u> | MacAddr48 | <u>O</u> | <u>0 . . . 1</u> | <u>Destination MAC address end. If this attribute is present, the destMacAddr attribute specifies the destination MAC address start. (NOTE y)</u> | <u>MacAddressRange</u> |

~~NOTE:~~
~~The EthDescription data type allows any combination of the defined properties.~~
<u>NOTE x:</u>
<u>The srcMacAddrMaskLen and srcMacAddrEnd are mutually exclusive.</u>
<u>NOTE y:</u>
<u>The destMacAddrMaskLen and destMacAddrEnd are mutually exclusive.</u>

In the table 1, the amendments/improvements are shown with marks, such as underlines and strikeout lines.

In embodiments of the present disclosure, the plurality of MAC addresses may comprise at least one of: a plurality of source MAC addresses; or a plurality of destination MAC addresses.

Particularly, as to destination MAC addresses, a first parameter may be "destMacAddr", and the second parameter may be "destMacAddrMaskLen" or "destMacAddrEnd". As to source MAC addresses, the first parameter may be "sourceMacAddr", and the second parameter may be "srcMacAddrMaskLen" or "srcMacAddrEnd". Further, the "srcMacAddrMaskLen" and "srcMacAddrEnd" may be mutually exclusive. The "destMacAddrMaskLen" and "destMacAddrEnd" may be mutually exclusive.

For example, "srcMacAddrMaskLen" specifies the source MAC address mask length which is used to mask the sourceMacAddr attribute (from the left/most significant bit to the right/least significant bit), namely to determine a common prefix, so as to support a set of MAC addresses.

E.g. a value 40 for a MAC address 00-10-A4-23-3E-00 could mean all MAC addresses from 00-10-A4-23-3E-00 up to and including 00-10-A4-23-3E-FF, with the same prefix "00-10-A4-23-3E".

Additionally, "srcMacAddrEnd" specifies source MAC address end. If this attribute is present, the "sourceMacAddr" attribute specifies the source MAC address start. E.g. "srcMacAddrEnd" with value 00-10-A4-23-3E-FE and "sourceMacAddr" with value 00-10-A4-23-3E-02 could means all continuous MAC addresses from 00-10-A4-23-3E-02 up to and including 00-10-A4-23-3E-FE.

Particularly, in "Npcf_PolicyAuthorization API", a description about the above parameters may also be added as follows.

"srcMacAddrMaskLen:
  type: integer
  minimum: 1
  maximum: 47
  description: Specifies the source MAC address mask length which is used to mask the sourceMacAddr attribute to support a set of MAC addresses.
destMacAddrMaskLen:
  type: integer
  minimum: 1
  maximum: 47
  description: Specifies the destination MAC address mask length which is used to mask the destMacAddr attribute to support a set of MAC addresses.
srcMacAddrEnd:
  $ref: 'TS29571_CommonData.yaml#/components/schemas/MacAddr48'
destMacAddrEnd:
  $ref: 'TS29571_CommonData.yaml#/components/schemas/MacAddr48'".

As another example, in embodiments of the present disclosure, the plurality of MAC addresses are continuous. The first parameter may comprise a start MAC address of the plurality of MAC addresses. The second parameter may comprise an integer value indicating number of addresses in the plurality of MAC addresses.

For example, the first parameter may comprise "00-10-A4-23-3E-00", and the second parameter may comprise an integer "256". These parameters could also mean all MAC addresses from 00-10-A4-23-3E-00 up to and including 00-10-A4-23-3E-FF (in total 256 MAC addresses). It should be understood, the integer "256" is just an example without limitation. For example, another integer "255" may be used to indicate "255 MAC addresses" continuously following the "00-10-A4-23-3E-00", thereby still meaning all MAC addresses from 00-10-A4-23-3E-00 up to and including 00-10-A4-23-3E-FF (in total 256 MAC addresses).

In embodiments of the present disclosure, the second parameter may be optional. The first parameter may be conditional and depend on a usage of the second parameter. The first parameter may be reused to indicate a single MAC address, when the second parameter is not used.

For example, as to destination MAC addresses, the second parameter "destMacAddrMaskLen" or "destMacAddrEnd" may be optional, and the first parameter "destMacAddr" is conditional. The first parameter "destMacAddr" shall be present if "destMacAddrMaskLen" or "destMacAddrEnd" is present.

Further, if "destMacAddrMaskLen" or "destMacAddrEnd" is not present, the "destMacAddr" may be still used to indicate a single destination MAC address.

In embodiments of the present disclosure, a feature about whether to use the second parameter may be negotiated between the first entity and the second entity.

Table 2 shows an exemplary list of supported features.

TABLE 2

(see table 5.8-1 in 3GPP TS 29.514 V16.1.0) Supported Features

| Feature number | Feature Name | Description |
| --- | --- | --- |
| 1 | InfluenceOnTrafficRouting | Indicates support of Application Function influence on traffic routing. If the PCF supports this feature, the AF may influence SMF routing to applications or subscribe to notifications of UP path management for the traffic flows of an active PDU session. |
| 2 | SponsoredConnectivity | Indicates support of sponsored data connectivity. If the PCF supports this feature, the AF may provide sponsored data connectivity to the SUPI. |
| 3 | MediaComponentVersioning | Indicates the support of the media component versioning. |
| 4 | AFRelocationAck | Indicates support of AF application relocation acknowledgement requirement. The InfluenceOnTrafficRouting feature shall be supported in order to support this feature. |
| 5 | AddrPreservation | Indicates support of UE address(es) preservation requirement. The InfluenceOnTrafficRouting feature shall be supported in order to support this feature. |
| x | MacAddressMask | Indicates the support of a set of MAC addresses with address mask in the traffic filter. |
| y | MacAddressRange | Indicates the support of a set of MAC addresses with a specific range in the traffic filter. |

The optional features in table 5.8-1 are defined for the Npcf_PolicyAuthorization API. They shall be negotiated using the extensibility mechanism defined in subclause 6.6.2 of 3GPP TS 29.500 V16.0.0.

For example, when requesting the PCF to create an Individual Application Session Context resource, the NF service consumer shall indicate the optional features the NF service consumer supports for the Npcf_PolicyAuthorization service by including the "suppFeat" attribute in the "App SessionContextReqData" data type of the HTTP POST request.

The PCF shall determine the supported features for the created Individual Application Session Context resource as specified in subclause 6.6.2 of 3GPP TS 29.500 V16.0.0. The PCF shall indicate the supported features in the HTTP response confirming the creation of the Individual Application Session Context resource by including the "suppFeat" attribute in the "App SessionContextRespData" data type.

In embodiments of the present disclosure, the new feature "MacAddressMask" may be used to indicate the support of a set of MAC addresses with address mask in the traffic filter, and the new feature "MacAddressRange" may be used to indicate the support of a set of MAC addresses with a specific range in the traffic filter. The new feature number "x", "y" may be any integer not occupied yet.

The improved type "EthFlowDescription" may be referred to in the communication network, so as to improve the efficiency of the communication network.

For example, a reference defined in 3GPP TS 29.122 V16.2.0 may be improved as follows. The improvements are underlined.

TABLE 3 improved ChargeableParty API re-used Data Types
(see Table 5.5.2.1.1-1 in 3GPP TS 29.122 V16.2.0)

| Data type | Reference | Comments |
| --- | --- | --- |
| EthFlowDescription | 3GPP TS 29.514 [52] | Defines a packet filter for an Ethernet flow. (NOTE) |
| MacAddr48 | 3GPP TS 29.571 [45] | MAC Address. |
| SupportedFeatures | 3GPP TS 29.571 [45] | Used to negotiate the applicability of the optional features defined in table 5.5.4-1. |

(NOTE):
In order to support a set of MAC addresses with address mask in the traffic filter, feature MacAddressMask as specified in clause 5.5.4 shall be supported. In order to support a set of MAC addresses with a specific range in the traffic filter, feature MacAddressRange as specified in clause 5.5.4 shall be supported.

TABLE 4 improved Features used by ChargeableParty API (see table 5.5.4-1 in 3GPP TS 29.122 V16.2.0)

| Feature Number | Feature | Description |
| --- | --- | --- |
| 1 | Notification_websocket | The delivery of notifications over Websocket is supported according to subclause 5.2.5.4. This feature requires that the Notification_test_event feature is also supported. |
| 2 | Notification_test_event | The testing of notification connection is supported according to subclause 5.2.5.3. |
| 3 | EthChgParty_5G | Chargeable Party for Ethernet UE. This feature may only be supported in 5G. |
| x | MacAddressMask_5G | Indicates the support of a set of MAC addresses with address mask in the traffic filter. This feature may only be supported in 5G. |
| y | MacAddressRange_5G | Indicates the support of a set of MAC addresses with a specific range in the traffic filter. This feature may only be supported in 5G. |

Feature: A short name that can be used to refer to the bit and to the feature, e.g. "Notification".
Description: A clear textual description of the feature.

TABLE 5 improved AsSessionWithQoS API re-used Data Types (see table 5.14.2.1.1-1 in 3GPP TS 29.122 V16.2.0)

| Data type | Reference | Comments |
| --- | --- | --- |
| EthFlowDescription | 3GPP TS 29.514 [52] | Defines a packet filter for an Ethernet flow. (NOTE) |
| MacAddr48 | 3GPP TS 29.571 [45] | MAC Address. |
| SupportedFeatures | 3GPP TS 29.571 [45] | Used to negotiate the applicability of the optional features defined in table 5.14.4-1. |

NOTE:
In order to support a set of MAC addresses with address mask in the traffic filter, feature MacAddressMask as specified in clause 5.8 shall be supported. In order to support a set of MAC addresses with a specific range in the traffic filter, feature MacAddressRange as specified in clause 5.8 shall be supported.

TABLE 6 improved Features used by AsSessionWithQoS API
(see table 5.14.4-1 in 3GPP TS 29.122 V16.2.0)

| Feature Number | Feature | Description |
|---|---|---|
| 1 | Notification_websocket | The delivery of notifications over Websocket is supported according to subclause 5.2.5.4. This feature requires that the Notification_test_event feature is also supported. |
| 2 | Notification_test_event | The testing of notifications connections is supported according to subclause 5.2.5.3. |
| 3 | EthAsSessionQoS_5G | Setting up required QoS for Ethernet UE. This feature may only be supported in 5G. |
| x | MacAddressMask_5G | Indicates the support of a set of MAC addresses with address mask in the traffic filter. This feature may only be supported in 5G. |
| y | MacAddressRange_5G | Indicates the support of a set of MAC addresses with a specific range in the traffic filter. This feature may only be supported in 5G. |

Feature: A short name that can be used to refer to the bit and to the feature, e.g. "Notification".
Description: A clear textual description of the feature.

As another example, a reference defined in 3GPP TS 29.522 V16.0.0 may be improved as follows. The definitions with improvements are shown in the table, and the specific improvements are underlined.

TABLE 7 improved Reused APIs applicable for both EPS and 5GS (see table 5.3.1-1 in 3GPP TS 29.522 V16.0.0)

| API Name | Differences |
|---|---|
| . . . | . . . |
| ChargeableParty | The "EthChgParty_5G", "MacAddressMask_5G" and "MacAddressRange_5G" features as described in subclause 5.5.4 of 3GPP TS 29.122 [4] may only be supported in 5G.<br>The events (i.e. LOSS_OF_BEARER, RECOVERY_OF_BEARER and RELEASE_OF_BEARER) do not apply for 5G. |
| AsSessionWithQoS | The "EthAsSessionQoS_5G", "MacAddressMask_5G" and "MacAddressRange_5G" features as described in subclause 5.14.4 of 3GPP TS 29.122 [4] may only be supported in 5G.<br>The events (i.e. LOSS_OF_BEARER, RECOVERY_OF_BEARER and RELEASE_OF_BEARER) do not apply for 5G. |
| . . . | . . . |

TABLE 8 improved Re-used Data Types (see table 5.4.3.2-1 in 3GPP TS 29.522 V16.0.0)

| Data type | Reference | Comments |
|---|---|---|
| . . . | . . . | . . . |
| EthFlowDescription | 3GPP TS 29.514 [7] | Contains the Ethernet data flow information. (NOTE) |
| . . . | . . . | . . . |

NOTE:
In order to support a set of MAC addresses with address mask in the traffic filter, feature MacAddressMask as specified in clause 5.4.4 shall be supported. In order to support a set of MAC addresses with a specific range in the traffic filter, feature MacAddressRange as specified in clause 5.4.4 shall be supported.

TABLE 9 improved Features used by TrafficInfluence API
(see table 5.4.4-1 in 3GPP TS 29.522 V16.0.0)

| Feature number | Feature Name | Description |
|---|---|---|
| 1 | Notification_websocket | The delivery of notifications over Websocket is supported as described in 3GPP TS 29.122 [4]. This feature requires that the Notification_test_event feature is also supported. |
| 2 | Notification_test_event | The testing of notification connection is supported as described in 3GPP TS 29.122 [4]. |
| 3 | AFRelocationAck | This feature indicates support of AF application relocation acknowledgement requirement. |
| 4 | AddrPreservation | Indicates support of UE address(es) preservation requirement. |
| x | MacAddressMask | Indicates the support of a set of MAC addresses with address mask in the traffic filter. |
| y | MacAddressRange | Indicates the support of a set of MAC addresses with a specific range in the traffic filter. |

Feature: A short name that can be used to refer to the bit and to the feature, e.g. "Notification".
Description: A clear textual description of the feature.

As another example, a reference defined in 3GPP TS 29.504 V16.0.0 may be improved as follows. The definitions with improvements are shown in the table, and the specific improvements are underlined.

TABLE 10 improved Supported Features (see table 6.1.8-1 in 3GPP TS 29.504 V16.0.0)

| Feature number | Feature Name | Description |
|---|---|---|
| 1 | DomainNameProtocol | This feature supports the additional protocol matching condition for the domain name in PFD data. |
| x1 | ResourceRemovalNotificationPolicyData | This feature indicates the support of the complete removal of a Policy Data resource. |
| x2 | ResourceNotificationExposureDataFix | This feature indicates the support of corrections to Notifications of data changes in the Exposure Data resource. |
| x | MacAddressMask | Indicates the support of a set of MAC addresses with address mask in the traffic filter in the application data resource. |
| y | MacAddressRange | Indicates the support of a set of MAC addresses with a specific range in the traffic filter in the application data resource. |

As another example, a reference defined in 3GPP TS 29.512 V16.1.0 may be improved as follows. The definitions with improvements are shown in the table, and the specific improvements are underlined.

TABLE 11 improved Npcf_SMPolicyControl re-used Data Types (see table 5.6.1-2 in 3GPP TS 29.512 V16.1.0)

| Data type | Reference | Comments | Applicability |
|---|---|---|---|
| . . . | . . . | . . . | . . . |
| AnGwAddress | 3GPP TS 29.514 [17] | Carries the control plane address of the access network gateway. (NOTE 1) | |
| . . . | . . . | . . . | . . . |
| EthFlowDescription | 3GPP TS 29.514 [17] | Defines a packet filter for an Ethernet flow. (NOTE x) | |
| . . . | . . . | . . . | |

NOTE 1:
"AnGwAddr" data structure is only applicable to the 5GS and EPC/E-UTRAN interworking scenario as defined in Annex B.
NOTE x:
In order to support a set of MAC addresses with address mask in the traffic filter, feature MacAddressMask as specified in clause 5.8 shall be supported. In order to support a set of MAC addresses with a specific range in the traffic filter, feature MacAddressRange as specified in clause 5.8 shall be supported.

TABLE 12 improved Supported Features (see table 5.8-1 in 3GPP TS 29.512 V16.1.0)

| Feature number | Feature Name | Description |
|---|---|---|
| ... | ... | ... |
| x | MacAddressMask | Indicates the support of a set of MAC addresses with address mask in the traffic filter. |
| y | MacAddressRange | Indicates the support of a set of MAC addresses with a specific range in the traffic filter. |

As another example, a reference defined in 3GPP TS 29.523 V15.2.0 may be improved as follows. The definitions with improvements are shown in the table, and the specific improvements are underlined.

TABLE 13 improved Npcf_EventExposure re-used Data Types (see table 5.6.1-2 in 3GPP TS 29.523 V15.2.0)

| Data type | Reference | Comments | Applicability |
|---|---|---|---|
| ... | ... | ... | ... |
| AnGwAddress | 3GPP TS 29.514 [12] | Carries the control plane address of the EPC untrusted non-3GPP access network gateway. (NOTE 1) | ... |
| ... | ... | ... | |
| EthFlowDescription | 3GPP TS 29.514 [12] | Identifies an ethernet flow description. (NOTE x) | ExtendedSessionInformation |
| ... | ... | ... | ... |

NOTE 1:
"AnGwAddress" data structure is only used to encode the ePDG address and is only applicable to the 5GS and EPC/E-UTRAN interworking scenario as defined in 3GPP TS 29.512 [9], Annex B.

NOTE x:
In order to support a set of MAC addresses with address mask in the traffic filter, feature MacAddressMask as specified in clause 5.8 shall be supported. In order to support a set of MAC addresses with a specific range in the traffic filter, feature MacAddressRange as specified in clause 5.8 shall be supported.

TABLE 14 improved Supported Features (see table 5.8-1 in 3GPP TS 29.523 V15.2.0)

| Feature number | Feature Name | Description |
|---|---|---|
| 1 | ExtendedSessionInformation | Indicates the support of additional session information in the subscription and report of policy control event. |
| x | MacAddressMask | Indicates the support of a set of MAC addresses with address mask in the traffic filter. |
| y | MacAddressRange | Indicates the support of a set of MAC addresses with a specific range in the traffic filter. |

As another example, a reference defined in 3GPP TS 29.519 V16.0.0 may be improved as follows. The definitions with improvements are shown in the table, and the specific improvements are underlined.

TABLE 15 improved Nudr_DataRepository re-used Data Types for Application
Data (see table 6.4.1-2 in the 3GPP TS 29.519 V16.0.0)

| Data type | Reference | Comments | Applicability |
| --- | --- | --- | --- |
| ApplicationId | 3GPP TS 29.571 [7] | Indicates an application identifier. | |
| DateTime | 3GPP TS 29.571 [7] | Indicates a date and time. | |
| DnaiChangeType | 3GPP TS 29.571 [7] | Describes the types of DNAI change. | |
| Dnn | 3GPP TS 29.571 [7] | Identifies a Data Network Name. | |
| EthFlowDescription | 3GPP TS 29.514 [16] | Contains the Ethernet data flow information. (NOTE) | |
| FlowInfo | 3GPP TS 29.122 [9] | Contains the flow information. | |
| NetworkAreaInfo | 3GPP TS 29.554 [13] | Describes a network area information. | |
| PfdDataForApp | 3GPP TS 29.551 [8] | Identifies the PFDs for one application identifier. | |
| RouteToLocation | 3GPP TS 29.571 [7] | Identifies the N6 traffic routing requirement. | |
| Snssai | 3GPP TS 29.571 [7] | Identifies a Single Network Slice Selection Assistance Information. | |
| SubscribedEvent | 3GPP TS 29.522 [19] | Identified the type of UP path management events of which the AF requests to be notified. | |
| Supi | 3GPP TS 29.571 [7] | Identifies a SUPI that shall contain either an IMSI or an NAI. | |
| SupportedFeatures | 3GPP TS 29.571 [7] | Used to negotiate the applicability of the optional features. | |
| Uri | 3GPP TS 29.571 [7] | Identifies a URI. | |

NOTE:
In order to support a set of MAC addresses with address mask in the traffic filter, feature MacAddressMask as specified in clause 5.4.4 shall be supported. In order to support a set of MAC addresses with a specific range in the traffic filter, feature MacAddressRange as specified in clause 6.1.8 of TS 29.504 [6] shall be supported.

Figure 8:
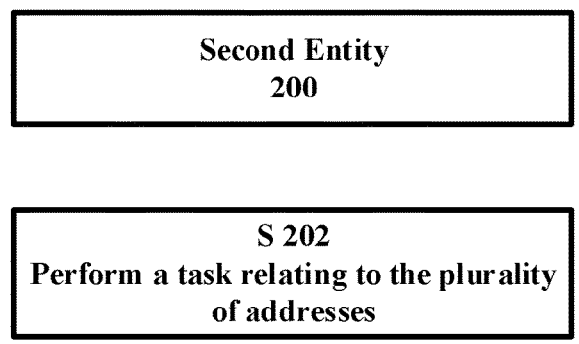
FIG. 8 is an exemplary flowing chart showing an additional step of the method performed by the second network entity, according to embodiments of the present disclosure.

FIG. 8 is an exemplary flowing chart showing an additional step of the method performed by the second network entity, according to embodiments of the present disclosure.

In embodiments of the present disclosure, the method may further comprise: step S202, performing a task relating to the plurality of addresses.

In embodiments of the present disclosure, the task may comprise a plurality of continuous processing procedures respectively relating to each of the plurality of addresses.

According to such embodiments, one advantage is that there is no need to change any function or API of the network entity which receives such improved message including the plurality of MAC addresses. Each of the plurality of MAC addresses may be inputted to such function or API as the input parameter in sequence. The processing efficiency is improved and the communication resources for transmitting the plurality of MAC addresses are reduced greatly.

In other embodiments of the present disclosure, the task may comprise a single processing procedure relating to all the plurality of addresses.

In general, each network entity mentioned previously shall apply the same handling as for a single MAC address, e.g. PCF will derive a PCC rule including the plurality of addresses to describe the service data flows which are entitled with the authorized QoS and charging. Or, SMF will instruct the UPF to detect traffic based on the plurality of addresses. Or, UDR, as user data repository, it stores the UE MAC addresses (which is same as a single UE Mac address) for describing the service data flows applicable for AF traffic influence.

Namely, one input parameter (the plurality of MAC addresses) is inputted to one function/API at the same time. This provides an advantage over the way of providing the addresses individually, which cause extra processing in each node.

Figure 9:
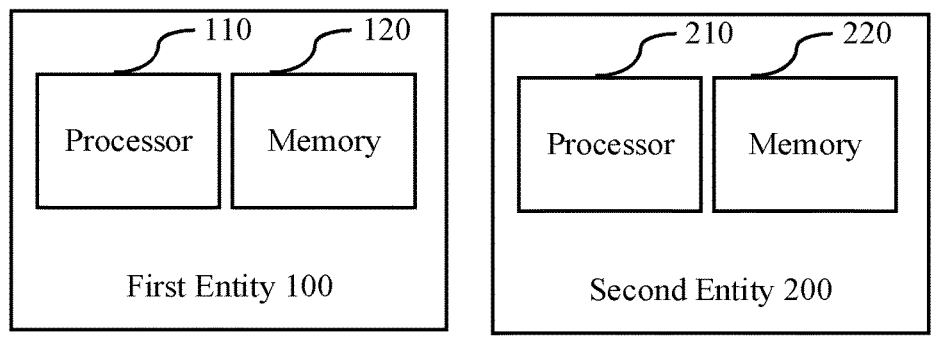
FIG. 9 is a block diagram showing apparatuses for the network entities, according to embodiments of the present disclosure.

FIG. 9 is a block diagram showing apparatuses for the network entities, according to embodiments of the present disclosure.

As shown in FIG. 9, the first entity 100 may comprise: a processor 110; and a memory 120, containing instructions executable by the processor 110. The first entity 100 is operative to: transmit, to a second entity, a message including a first parameter and a second parameter. The first parameter and the second parameter indicate the plurality of MAC addresses.

In embodiments of the present disclosure, the first entity is further operative to implement any of the methods according to the first aspect above described.

As shown in FIG. 9, the second entity 200 may comprise: a processor 210; and a memory 220, containing instructions executable by the processor 210. The second entity 200 is operative to: receive, from a first entity, a message including a first parameter and a second parameter. The first parameter and the second parameter indicate the plurality of MAC addresses.

In embodiments of the present disclosure, the second entity is further operative to implement any of the methods according to the second aspect above described.

The processor 110 and processor 210 may be any kind of processing component, such as one or more microprocessor or microcontrollers, as well as other digital hardware, which may include digital signal processors (DSPs), special-purpose digital logic, and the like. The memory 120 and memory 220 may be any kind of storage component, such as read-only memory (ROM), random-access memory, cache memory, flash memory devices, optical storage devices, etc.

Figure 10:
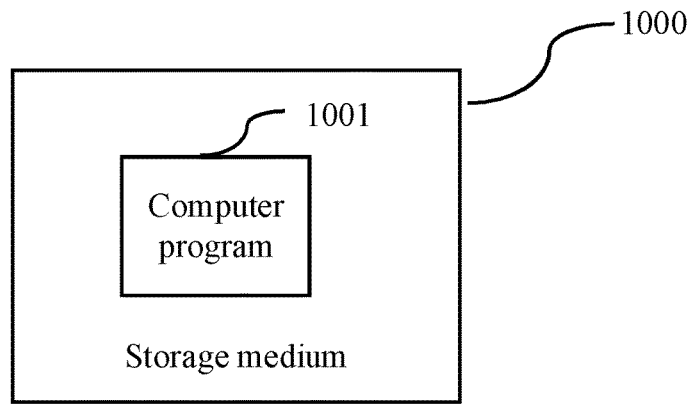
FIG. 10 is a block diagram showing a computer readable storage medium, according to embodiments of the present disclosure.

FIG. 10 is a block diagram showing a computer readable storage medium, according to embodiments of the present disclosure.

As shown in FIG. 10, a computer readable storage medium 1000 having a computer program 1001 stored thereon. The computer program 1001 is executable by an entity to cause the entity to carry out any of the methods according to the first and second aspects above described.

The computer readable storage medium 1000 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Figure 11:
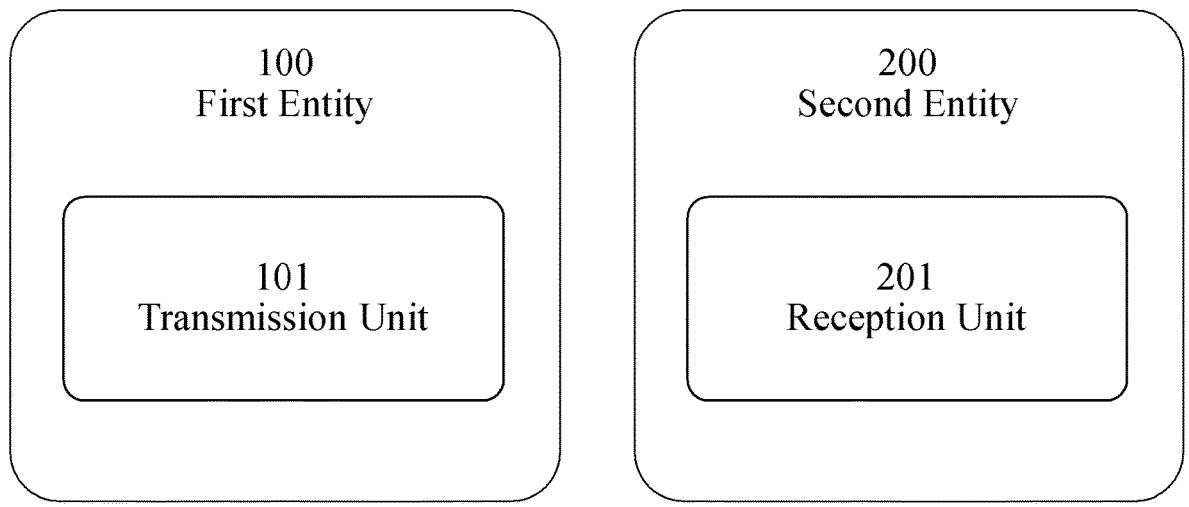
FIG. 11 is a block diagram showing function units of the apparatuses, according to embodiments of the present disclosure.

FIG. 11 is a block diagram showing function units of the apparatuses, according to embodiments of the present disclosure.

As shown in FIG. 11, the first network entity 100 may comprise: a transmission unit 101, configured to transmit, to a second entity, a message including a first parameter and a second parameter. The first parameter and the second parameter indicate the plurality of MAC addresses.

In embodiments of the present disclosure, the first entity is further operative to implement any of the methods according to the first aspect above described.

As shown in FIG. 11, the second entity 200 may comprise: a reception unit 201, configured to receive, from a first entity, a message including a first parameter and a second parameter. The first parameter and the second parameter indicate the plurality of MAC addresses.

In embodiments of the present disclosure, the second entity is further operative to implement any of the methods according to the second aspect above described.

The term unit/function unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the apparatus 100 or 200 may not need a fixed processor or memory, any computing resource and storage resource may be arranged from at least one network node/device/entity/apparatus in the communication system. The virtualization technology and network computing technology may be further introduced, so as to improve the usage efficiency of the network resources and the flexibility of the network.

Embodiments of the present disclosure further provides a method implemented in a communication system, comprising: at a first entity, transmitting a plurality of media access control, MAC, addresses, comprising: transmitting (S101), to a second entity, a message including a first parameter and a second parameter; at a second entity, receiving the plurality of media access control, MAC, addresses, comprising: receiving (S201), from the first entity, the message including the first parameter and the second parameter. The first parameter and the second parameter indicate the plurality of MAC addresses. The plurality of MAC addresses comprises: a plurality of source MAC addresses; and/or a plurality of destination MAC addresses.

Embodiments of the present disclosure further provides a communication system comprising: a first entity configured to perform: transmitting a plurality of media access control, MAC, addresses, comprising: transmitting (S101), to a second entity, a message including a first parameter and a second parameter; a second entity configured to perform: receiving the plurality of MAC addresses, comprising: receiving (S201), from the first entity, the message including the first parameter and the second parameter. The first parameter and the second parameter indicate the plurality of MAC addresses. The plurality of MAC addresses comprises: a plurality of source MAC addresses; and/or a plurality of destination MAC addresses.

According to embodiments of the present disclosure, a plurality of MAC addresses may be simultaneously transmitted among the nodes in the communication network, and thus the efficiency of the communication network may be further improved.

Particularly, a list of MAC addresses is supported by adding the MAC address mask length for both source and target MAC addresses with feature control; and a specific range of MAC addresses may be supported by adding the MAC address end with feature control.

The embodiments of the present disclosure may avoid: inefficient encoding for the Ethernet flow, and possibly increased number of PCC rules due to increased number of media subcomponents.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed at a first entity for transmitting a plurality of media access control, MAC, addresses, comprising:
   transmitting, to a second entity, a message including a first parameter and a second parameter;
   wherein only the first parameter and the second parameter are used by the second entity to determine the plurality of MAC addresses as a result of the second parameter being included in the message; and
   wherein the plurality of MAC addresses comprises: a plurality of source MAC addresses; and/or a plurality of destination MAC addresses;
   wherein the plurality of MAC addresses is continuous;
   wherein the first parameter comprises a start MAC address of the plurality of MAC addresses;
   wherein the second parameter comprises an end MAC address of the plurality of MAC addresses;
   wherein the second parameter is optional;
   wherein the first parameter is conditional and depends on a usage of the second parameter;
   wherein the first parameter is reused to indicate a single MAC address, when the second parameter is not used; and
   wherein a feature about whether to use the second parameter is negotiated between the first entity and the second entity, wherein negotiating between the first entity and the second entity comprises transmitting, to the second entity, a message indicating that the first entity supports the transmission of the plurality of MAC addresses.

2. The method according to claim 1, wherein the message comprises:
   a traffic influence request message, from an application function, AF, to a network exposure function, NEF.

3. The method according to claim 1,
   wherein the first entity comprises at least one of: an AF, a NEF, a PCF, and a UDR; and
   wherein the second entity comprises at least one of: a PCF, a NEF, SMF, and a UDR.

4. A first entity, comprising:
   a processor; and
   a memory, containing instructions executable by the processor;
   wherein the first entity is operative to implement the method according to claim 1.

5. The method according to claim 1, wherein the message comprises a policy authorization request message, from an application function, AF, to a policy control function, PCF.

6. The method according to claim 1, wherein the message comprises a policy authorization request message, from a network exposure function, NEF, to a policy control function, PCF.

7. The method according to claim 1, wherein the message comprises a session management policy control request message, from a policy control function, PCF, to a session management function, SMF.

8. The method according to claim 1, wherein the message comprises a data repository request message, from a network exposure function, NEF, to a unified data repository, UDR.

9. The method according to claim 1, wherein the message a data repository request message, from a unified data repository, UDR, to a policy control function, PCF.

10. A method performed at a second entity for receiving a plurality of media access control, MAC, addresses, comprising:
    receiving, from a first entity, a message including a first parameter and a second parameter;
    wherein only the first parameter and the second parameter are used by the second entity to determine the plurality of MAC addresses as a result of the second parameter being included in the message; and
    wherein the plurality of MAC addresses comprises: a plurality of source MAC addresses; and/or a plurality of destination MAC addresses; wherein the plurality of MAC addresses is continuous;
    wherein the first parameter comprises a start MAC address of the plurality of MAC addresses;
    wherein the second parameter comprises an end MAC address of the plurality of MAC addresses;
    wherein the second parameter is optional;
    wherein the first parameter is conditional and depends on a usage of the second parameter;
    wherein the first parameter is reused to indicate a single MAC address, when the second parameter is not used; and
    wherein a feature about whether to use the second parameter is negotiated between the first entity and the second entity, wherein negotiating between the first entity and the second entity comprises receiving, from the first entity, a message indicating that the first entity supports the transmission of the plurality of MAC addresses.

11. The method according to claim 10, wherein the message comprises at least one of:
    a policy authorization request message, from an application function, AF, to a policy control function, PCF;
    a traffic influence request message, from an AF to a network exposure function, NEF;
    a policy authorization request message, from a NEF to a PCF;
    a session management policy control request message, from a PCF, to a session management function, SMF;
    a data repository request message, from a NEF to a unified data repository, UDR; and
    a data repository request message, from a UDR to a PCF.

12. The method according to claim 10,
    wherein the first entity comprises at least one of: an AF, a NEF, a PCF, and a UDR; and
    wherein the second entity comprises at least one of: a PCF, a NEF, SMF, and a UDR.

13. The method according to claim 10, further comprising:
    performing a task relating to the plurality of addresses.

14. The method according to claim 13, wherein the task comprises a single processing procedure relating to all the plurality of addresses.

15. The method according to claim 13, wherein the task comprises a plurality of continuous processing procedures respectively relating to each of the plurality of addresses.

16. A second entity, comprising:
a processor; and
a memory, containing instructions executable by the processor;
wherein the second entity is operative to implement the method according to claim 10.

\* \* \* \* \*

UNITED STATES PATENT AND TRADEMARK OFFICE
CERTIFICATE OF CORRECTION

| | | |
|---|---|---|
| PATENT NO. | : 12,149,501 B2 | Page 1 of 1 |
| APPLICATION NO. | : 17/632919 | |
| DATED | : November 19, 2024 | |
| INVENTOR(S) | : Xu et al. | |

It is certified that error appears in the above-identified patent and that said Letters Patent is hereby corrected as shown below:

On the Title Page

In Item (56), under "OTHER PUBLICATIONS", in Column 2, Line 1, delete "Goupcast" and insert -- Groupcast --, therefor.

In the Specification

In Column 1, Line 50, delete "an" and insert -- is an --, therefor.

In Column 2, Line 5, delete "provide" and insert -- to provide --, therefor.

In Column 5, Line 36, delete "an" and insert -- is an --, therefor.

In Column 7, Line 3, delete "SC S/AS," and insert -- SCS/AS, --, therefor.

In Columns 17 & 18, in TABLE 6, under "Description", Line 3, delete "featute" and insert -- feature --, therefor.

In the Claims

In Column 27, Line 21, in Claim 1, delete "message; and" and insert -- message; --, therefor.

In Column 28, Line 5, in Claim 9, delete "a data" and insert -- is a data --, therefor.

In Column 28, Line 16, in Claim 10, delete "message; and" and insert -- message; --, therefor.

Signed and Sealed this
Twenty-second Day of April, 2025

Coke Morgan Stewart
*Acting Director of the United States Patent and Trademark Office*